United States Patent [19]

Niedospial, Jr. et al.

[11] Patent Number: 4,887,776
[45] Date of Patent: * Dec. 19, 1989

[54] FILM CASSETTE

[75] Inventors: John J. Niedospial, Jr., Rochester; Bradley S. Bush, Hilton, both of N.Y.

[73] Assignee: Eastman Kodak Company, Rochester, N.Y.

[*] Notice: The portion of the term of this patent subsequent to Jul. 11, 2006 has been disclaimed.

[21] Appl. No.: 320,441

[22] Filed: Mar. 8, 1989

[51] Int. Cl.4 ............................................. G03B 17/26
[52] U.S. Cl. .................................. 242/71.1; 242/71.8; 354/275
[58] Field of Search ....................... 242/71, 71.1, 71.8, 242/71.9; 354/275

[56] References Cited

U.S. PATENT DOCUMENTS

| | | | |
|---|---|---|---|
| 988,341 | 4/1911 | Hill . | |
| 2,541,476 | 2/1951 | Mihalyi | 242/71 |
| 3,234,024 | 2/1966 | Leinonen | 96/78 |
| 3,556,435 | 1/1971 | Wangerin | 242/210 |
| 3,659,799 | 5/1972 | Ceruhi et al. | 242/71.9 |
| 3,677,499 | 7/1972 | Wangerin | 242/210 |
| 3,797,777 | 3/1974 | Hosono et al. | 242/197 |
| 3,856,228 | 12/1974 | Hosono et al. | 242/71.8 |
| 4,407,579 | 10/1983 | Huff | 354/275 |
| 4,423,943 | 1/1984 | Gold | 354/275 |
| 4,488,796 | 12/1984 | Edwards | 354/275 |

Primary Examiner—Stuart S. Levy
Assistant Examiner—Steven M. duBois
Attorney, Agent, or Firm—Roger A. Fields

[57] ABSTRACT

A film cassette is disclosed wherein a spool includes two coaxial core pieces having a convoluted film roll coiled about them, whose outermost convolution is a film leader, and respective flanges fixed to the core pieces which radially extend over the opposite sides of the film roll. At least one of the core pieces is supported for movement axially toward the other one to move at least one of the flanges axially toward the other one to provide axial clamping forces at the opposite sides of the film roll. A film stripper-guide is received between the outermost convolution and the next-inward convolution of the film roll to strip the outermost convolution from the flanges and guide it through a film passageway to the exterior of the cassette shell responsive to rotation of the spool in a film unwinding direction during application of the axial clamping forces. According to the invention, at least one of the flanges includes integral means for concentrating the axial clamping forces substantially at the outermost convolution of the film roll and preventing application of the axial clamping forces substantially at the more-inward convolutions of the film roll.

7 Claims, 5 Drawing Sheets

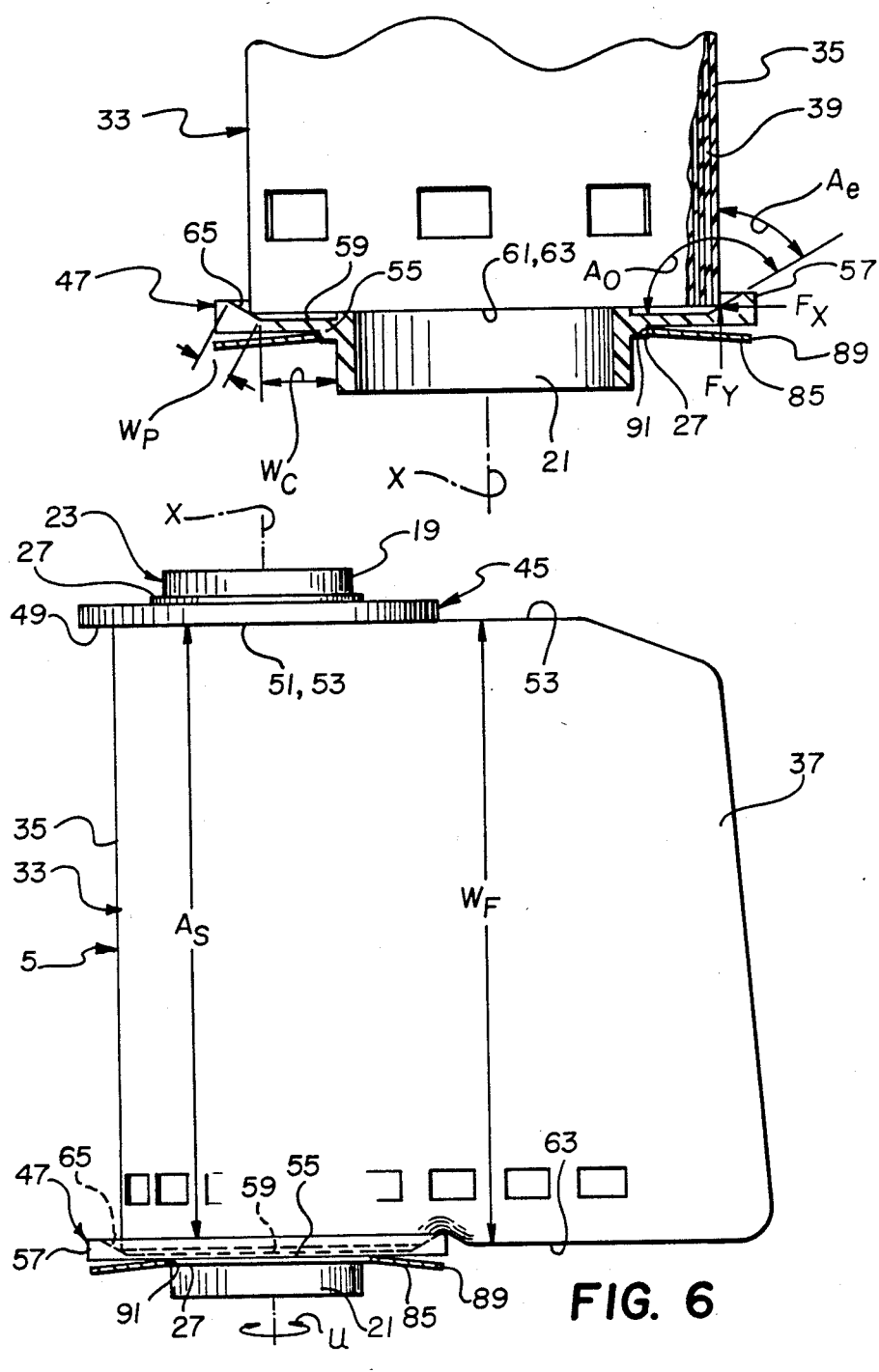

FILM CASSETTE

CROSS-REFERENCE TO RELATED APPLICATIONS

Reference is made to commonly assigned copending applications Ser. No. 185,001, entitled FILM CASSETTE, and filed Apr. 22, 1988 in the name of Patricia D. Fairman, and Ser. No. 071,320,438 entitled FILM CASSETTE, and filed Mar. 8, 1989 in the names of John J. Niedospial and Patricia D. Fairman.

BACKGROUND OF THE INVENTION

1. Field of the Invention

The invention relates generally to the field of photography, and particularly to a film cassette containing roll film.

2. Description of the Prior Art

In conventional 35 mm film manufacturers' cassettes, such as manufactured by Eastman Kodak Company and Fuji Photo Film Co. Ltd., the filmstrip is wound on a flanged spool which is rotatably supported within a cylindrical shell. A leading section of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attachd to the spool, and the fogged leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed which, unlike conventional film cassettes, can be operated to automatically advance the filmstrip out of the cassette shell by rotating the film spool in the unwinding direction. The film leader normally does not protrude from the cassette shell. Specifically, in U.S. Pat. No. 4,407,579, granted Oct. 4, 1983, there is disclosed a film cassette wherein the film spool is comprised of two spool pieces constructed to telescopically receive one another. Each spool piece includes a radially extending flange which is adapted to lie closely adjacent to but not in contact with one of the opposite sides of the film roll. A trailing end of the film roll is attached to one of the spool pieces, and a leading end of the roll rests against a cylindrical insert located between the two flanges and the cassette shell. The insert restricts the maximum diameter of the film roll to a value less than the diameter of the flanges, and it includes an integral stripper-guide located immediately ahead of a slot in the insert which leads to the light-trapped film passage opening of the cassette shell. To move the leading end of the film roll over the stripper-guide, into the slot, and through the light-trapped opening, to make it available outside the film cassette, one must manually grasp the opposite ends of the film spool and move the two spool pieces axially toward one another until the flanges are axially positioned in firm clamping relation with the opposite sides of the film roll. While maintaining this inwardly directed manual pressure against the two spool pieces, one then must rotate the film spool relative to the cassette shell in an unwinding direction. As a result, the leading end of the film roll will be rotated relative to the insert, causing it to be advanced over the stripper-guides into the slot, and through the light-trapped opening to the outside of the cassette shell.

To increase the gripping effect of the two flanges at the opposite sides of the film roll in U.S. Pat. No. 4,407,579, the flanges include a friction-producing material such as rubber which is axially compressed against the opposite sides of the film roll. This significantly increases the manufacturing expense of the film cassette. Moreover, it is possible especially in high temperature and/or humidity conditions that the opposite sides of the film roll may adhere to the rubber, in which instance a film advance failure may occur.

THE CROSS-REFERENCED APPLICATIONS

Cross-referenced application Ser. No. 185,001 discloses a film cassette wherein the leading end of a film roll coiled about a film spool is located within the cassette shell. The film spool is comprised of two spool pieces constructed to telescopically receive one another. Each spool piece includes a radially extending flange normally disposed adjacent one of the opposite sides of the film roll. When the film spool is initially rotated in a film unwinding direction, a rotation-responsive cam device coupling the two spool pieces automatically moves one spool piece axially toward the other piece to cause the respective flanges to firmly clamp the film roll at its opposite sides. As a result, the leading end of the film roll will be rotated past a stripper-guide which strips the leading end from between the flanges and guides it through a light-trapped opening in the cassette shell. Thus, rotation of the film spool in the unwinding direction will advance the leading end to the outside of the cassette shell.

In cross-referenced application Ser. No. 185,001, the two flanges are slightly concave-shaped, and several ribs located on an interior wall of the cassette shell protrude radially between the flanges to circumferentially confine the outermost convolution of the film roll in order to prevent that convolution from clock-springing beyond the periphery of each flange. When the flanges firmly clamp the film roll at its opposite sides, the slight concave shape of the flanges may operate to slightly transversely pinch the outermost convolution of the film roll. In any event, the leading end of the film roll will tend to slightly separate from the next-inward convolution of the film roll to facilitate movement of the leading end over the stripper-guide responsive to rotation of the film spool in the film unwinding direction.

SUMMARY OF THE INVENTION

According to the invention, there is provided an improved film cassette wherein (a) a spool includes two coaxial core pieces having a convoluted film roll coiled about them, whose outermost convolution is a film leader, and respective flanges fixed to the core pieces which radially extend over the opposite sides of the film roll, (b) at least one of the core pieces is supported for movement axially toward the other one to move at least one of the flanges axially toward the other one to provide axial clamping forces at the opposite sides of the film roll, and (c) a film stripper-guide is received between the outermost convolution and the next-inward convolution of the film roll to strip the outermost convolution from the flanges and guide it through a film passageway to the exterior of the cassette shell responsive to rotation of the spool in a film unwinding direction during application of the axial clamping forces, and wherein the improvement comprises:

at least one of the flanges includes integral means for concentrating the axial clamping forces substantially at the outermost convolution of the film roll and preventing application of the axial clamping forces substantially at the more-inward convolutions of the film roll.

In a preferred embodiment of the invention, the integral means includes an inside central annular flat face of one of the flanges, closely spaced from one of the opposite sides of the film roll, and an inside peripheral annular beveled face of the same flange, circumferentially inclined from the central flat face to normally intimately contact one of the opposite longitudinal edges of the outermost convolution of the film roll. It has been found that this design more reliably ensures film advance to the exterior of the cassette shell.

BRIEF DESCRIPTION OF THE DRAWINGS

FIG. 5 is an elevation view partly in section similar to FIG. 4, illustrating certain details of the film roll and the film spool; and FIG. 6 is an elevation view similar to FIG. 4 illustrating the manner in which the film roll is unwound from the film spool.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
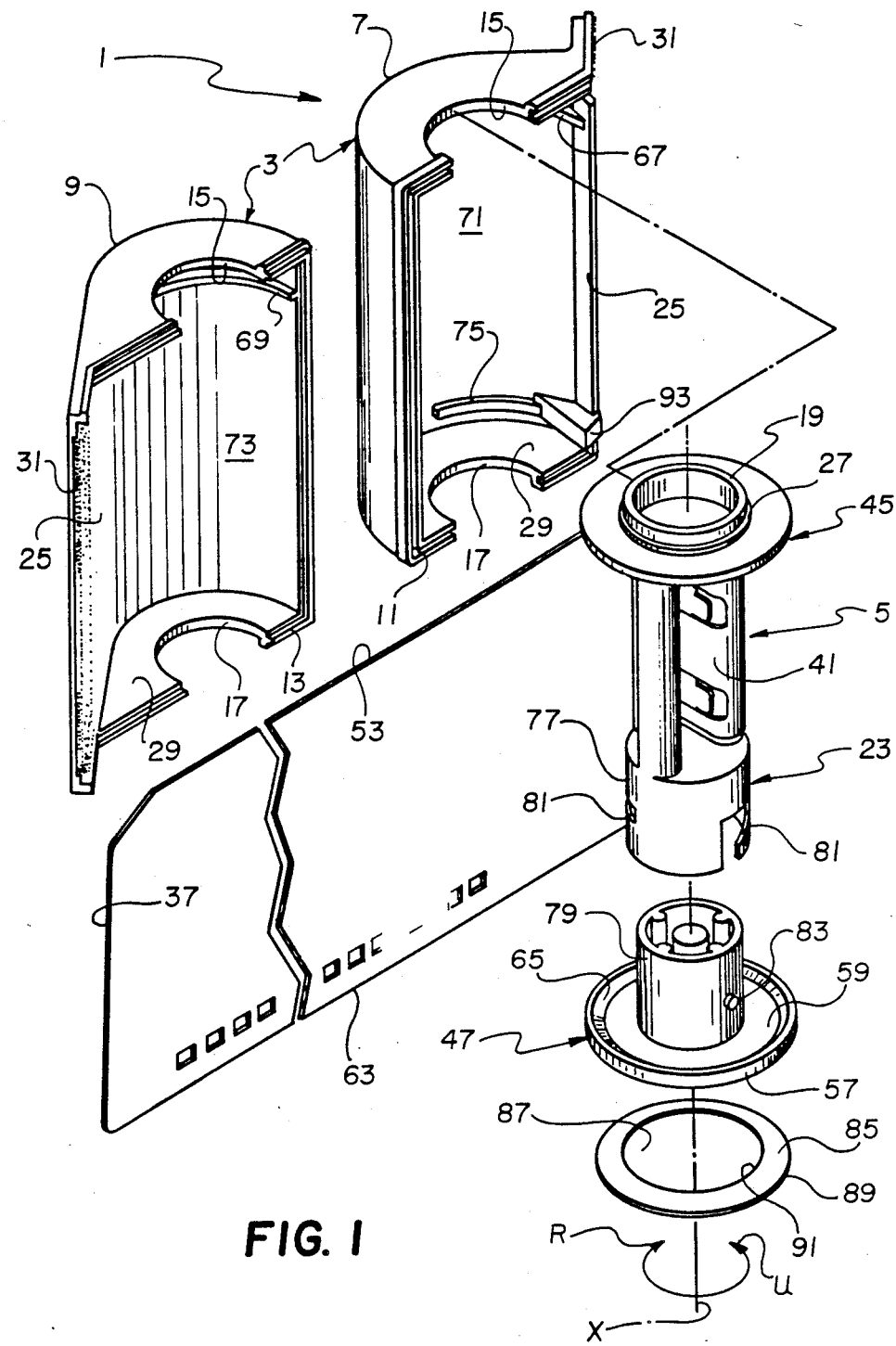
FIG. 1 is an exploded perspective view of an improved film cassette according to a preferred embodiment of the invention.
Figure 2:
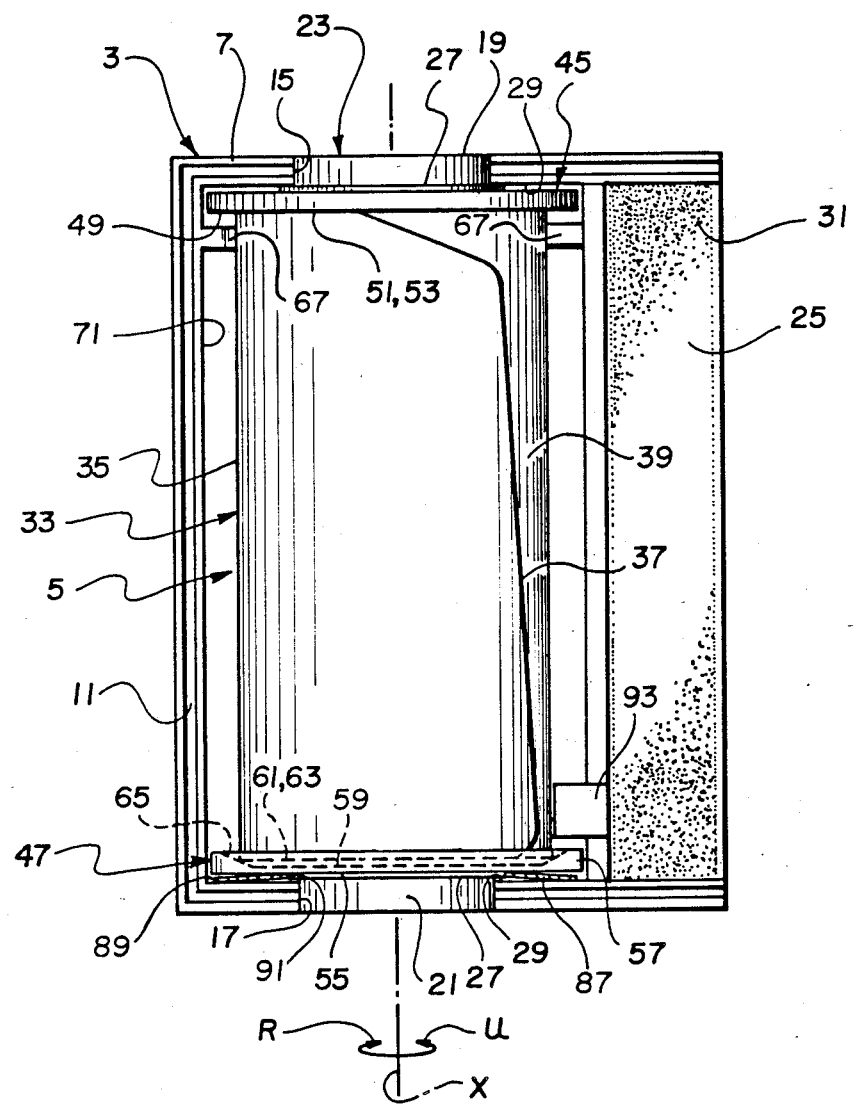
FIG. 2 is an elevation view of the film cassette, illustrating the cassette shell open to reveal a film roll coiled about a film spool.

Referring now to the drawings, FIGS. 1 and 2 depict an improved 35 mm film cassette 1 comprising a light-tight cassette shell 3 and a film spool 5 which is rotatable about an axis X in film unwinding and rewinding direction U and R within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for upper and lower opposite end extensions 19 and 21 of a spool core or hub 23, and they define a film passageway 25 to the exterior of the cassette shell 3. The upper and lower end extensions 19 and 21 of the spool core 23 include respective integral annular surrounds 27 located adjacent upper and lower inside faces 29 of the cassette shell 3 which encircle the two openings 15 and 17. This is to prevent ambient light from entering the interior of the cassette shell 3 through the openings 15 and 17. A known black velvet or plush material 31 lines the interior of the film passageway 25 to prevent ambient light from entering the film passageway.

Figure 3:
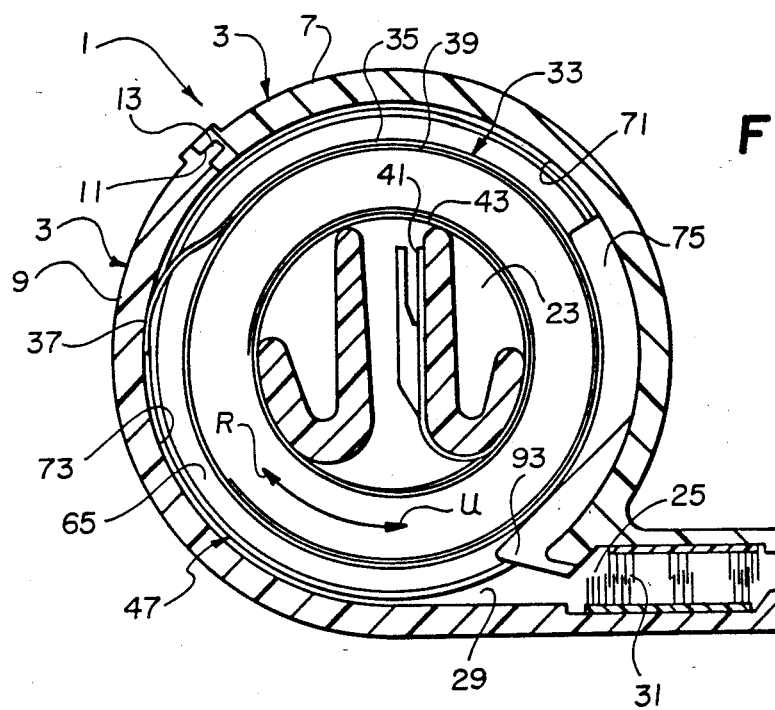
FIG. 3 is an end view in cross-section of the cassette shell, the film roll, and the film spool.
Figure 4:
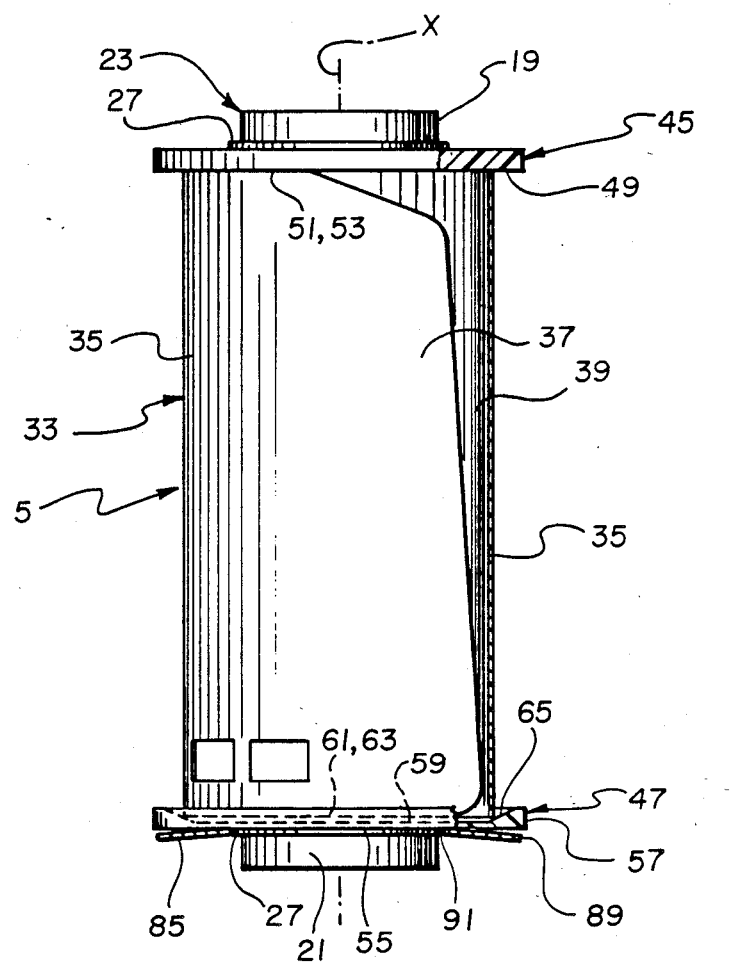
FIG. 4 is an elevation view partially in section of the film roll and the film spool, illustrating the manner in which the film roll is stored on the film spool.

A roll 33 of 35 mm filmstrip is coiled about the spool core 23 to form successive film convolutions. As shown in FIG. 3, the film roll 33 includes an outermost convolution 35 which is a film leader having a leading or forward end 37, and it includes a next-inward convolution 39 coiled behind the outermost convolution. An inner or trailing end 41 of an innermost convolution 43 of the film roll 33 is secured to the spool core 23.

A pair of upper and lower flanges 45 and 47 radially extend from the spool core 23 as shown in FIGS. 1, 2, 4 and 5. The upper flange 45 is disk-like, and it has a circular flat inside face 49 that contacts an upper side 51 of the film roll 33 defined by the upper longitudinal edge 53 of each successive convolution of the film roll 33, including the outermost convolution (film leader) 35. The lower flange 47 comprises a disk portion 55 and an annular lip or skirt portion 57 which circumferentially extends from the disk portion. The disk portion 55 has an inside central annular flat face 59 that is closely spaced from a lower side 61 of the film roll 33 defined by the lower longitudinal edge 63 of each successive convolution of the film roll. The annular lip portion 57 has an inside peripheral annular beveled face 65 that is circumferentially inclined from the central flat face 59 to normally intimately contact the lower longitudinal edge 63 of the outermost convolution (film leader) 35 and perhaps the next-inward convolution 39 of the film roll 33, to radially constrain the film roll at the lower longitudinal edge and thereby restrict the maximum diameter of the film roll 33 to a value less than the diameter of the two flanges 45 and 47. The peripheral beveled face 65 has a width $W_p$ that is less than the width $W_e$ of the central flat face 59, and it is inclined an obtuse angle $A_o$ with respect to the central flat face. See FIG. 5. The obtuse angle $A_o$ is sufficient to allow the peripheral beveled face 65 to form a capture angle $A_e$ with respect to the outermost convolution (film leader) 35. Preferably the capture angle $A_e$ is within the range of 35° to 45°.

The maximum diameter of the film roll 33 may further be restricted to a value less than the diameter of the two flanges 45 and 47 by a pair of arcuate ribs 67 and 69 fixed to the two halves 7 and 9 of the cassette shell 3 at their respective inner walls 71 and 73 and by a single arcuate rib 75 fixed to the first-numbered inner wall. The three ribs 67, 69 and 75 protrude radially between the two flanges 45 and 47 to circumferentially confine the outermost convolution (film leader) 35 of the film roll 33. See FIGS. 1–3. Preferably, the ribs 67, 69 and 75 are relatively smooth at their respective areas of contact with the outermost convolution 35.

As shown in FIG. 1, the spool core 23 is comprised of two hollow, cylindrical, coaxial pieces 77 and 79. The upper core piece 77 is integrally formed with the upper flange 45 and the lower core piece 79 is integrally formed with the lower flange 47. The upper core piece 77 is constructed to telescopically receive the lower core piece 79 in order to vary the axial distance between the upper and lower flanges 45 and 47. The specific means for varying the axial distance between the two flanges 45 and 47 consists of a pair of inclined, opposite cam edges or ramps 81 located on the upper core piece 77 and respective cam follower pins 83 located on the lower core piece 79. If the lower core piece 79 is initially rotated relative to the upper core piece 77 in the film unwinding direction U, the interaction between the two cam edges 81 and the respective follower pins 83 will cause the lower core piece to be further received within the upper core piece, i.e. the lower core piece will be moved axially toward the upper core piece, thereby slightly reducing the axial distance between the two flanges 45 and 47. The lower core piece 79 can be moved axially toward the upper core piece 77 only until the peripheral beveled face 65 of the lower flange 47 is moved into a very firm compressive relation with the lower longitudinal edge 63 of the outermost convolution (film leader) 35. Then, continued rotation of the lower core piece 79 in the unwinding direction will rotate the film roll 33 in the same direction.

When the lower core piece 79 is moved axially toward the upper core piece to shift the peripheral beveled face 65 of the lower flange 47 into a very firm compressive relation with the lower longitudinal edge 63 of the outermost convolution (film leader) 35, axial clamping forces are concentrated for the most part at the outermost convolution. FIG. 5 schematically illustrates the X-component $F_x$ and the Y-component $F_y$ of these clamping forces at the outermost convolution 35. Thus, the $F_x$ force component acts to radially constrain the outermost convolution (film leader) 35 at its lower longitudinal edge 35, and the $F_y$ component acts to ensure a non-slipping relation between that longitudinal edge and the peripheral beveled face 65 of the lower flange 47. The non-slipping relation is necessary to rotate the film roll 33 in the unwinding direction U responsive to rotation of the film spool 5 in the same direction.

A spring-washer 85 as shown in FIGS. 1 and 2 has a central opening 87 through which the lower extension 21 of the spool core 23 axially extends. The spring washer 85 has a circumferential edge 89 in contact with the lower inside face 29 of the cassette shell 3 and an inner edge 91 (defining the central opening 87) in contact with the annular surround 27 of the lower extension. Thus, the spring-washer 85 operates as a compressive spring to normally urge the peripheral beveled face 65 of the lower flange 47 against the lower longitudinal edge 63 of the outermost convolution (film leader) 35. See FIG. 5.

A film-stripper guide 93 formed with the cassette half 7 is positioned immediately inward of the inner entry to the film passageway 25 to be received between the leading end 37 of the outermost convolution (film leader) 35 and the next-inward convolution 39, to pick up the leading end and guide it into the film passageway responsive to rotation of the film spool 5 in the film unwinding direction U during application of the axial clamping forces. The leading end 37 will be advanced over the stripper-guide 93 and into the film passageway 25, rather than between the stripper-guide and the next-inward convolution 39, because it tends to be transversely bowed by the axial clamping forces and therefore will slightly separate from the next-inward convolution 39 of the film roll 5.

When the leading end 37 of the outermost convolution (film leader) 35 is advanced over the stripper-guide 93 responsive to rotation of the film spool 5 in the film unwinding direction U during application of the axial clamping forces, the lower longitudinal edge 63 of that convolution will be slightly flexed by the annular lip portion 57 of the lower flange 47 as shown in FIG. 6 to allow successive longitudinal sections of the film roll 33 (beginning with the leading end) to exit from between the flanges to the outside of the cassette shell 3. The local flexing of the lower longitudinal edge 63 of the outermost convolution 35 occurs because the film width $W_F$ between that edge and the upper longitudinal edge 63 of the outermost convolution is slightly greater than the axial spacing $A_S$ between the upper flange 45 and the annular lip portion 57 of the lower flange 47.

The invention has been described with reference to a preferred embodiment. However, it will be appreciated that variations and modifications can be effected within the ordinary skill in the art without departing from the scope of the invention. For example, instead of using the spring-washer 93 to limit axial separation between the two flanges 45 and 47, the cassette shell 3 can be designed to close tolerances to achieve that purpose.

We claim:

1. An improved film cassette where (a) a spool includes two coaxial core pieces having a convoluted film roll coiled about them, whose outermost convolution is a film leader, and respective flanges fixed to said core pieces which radially extend over the opposite sides of said film roll, (b) at least one of said core pieces is supported for movement axially toward the other one to move at least one of said flanges axially toward the other one to provide axial clamping forces at the opposite sides of said film roll, and (c) a film stripper-guide is received between said outermost convolution and the next-inward convolution of said film roll to strip said outermost convolution from said flanges and guide it through a film passageway to the exterior of the cassette shell responsive to rotation of said spool in a film unwinding direction during application of said axial clamping forces, and wherein the improvement comprises:

at least one of said flanges includes integral means for concentrating said axial clamping forces substantially at said outermost convolution of the film roll and preventing application of the axial clamping forces substantially at the more-inward convolutions of said film roll.

2. The improvement as recited in claim 1, wherein said integral means includes an inside central annular flat face of one of said flanges, closely spaced from one of the opposite sides of said film roll, and an inside peripheral annular beveled face of the same flange, circumferentially inclined from said central flat face to normally intimately contact one of the opposite longitudinal edges of said outermost convolution of the film roll.

3. The improvement as recited in claim 2, wherein said peripheral beveled face has a width that is less than the width of said central flat face.

4. The improvement as recited in claim 3, wherein said peripheral beveled face is inclined an obtuse angle with respect to said central flat face.

5. The improvement as recited in claim 4, wherein said obtuse angle is sufficient to allow said peripheral beveled face to form a capture angle with respect to said outermost convolution of the film roll that is at least thirty degrees.

6. The improvement as recited in claim 5, wherein said capture angle is within the range of thirty degrees and forty-five degrees.

7. An improved film cassette where (a) a spool includes two coaxial core pieces having a convoluted film roll coiled about them, whose outermost convolution is a film leader, and respective flanges fixed to said core pieces which radially extend over the opposite sides of said film roll, (b) at least one of said core pieces is supported for movement axially toward the other one to move at least one of said flanges axially toward the other one to provide axial clamping forces at the opposite sides of said film roll, and (c) a film stripper-guide is received between said outermost convolution and the next-inward convolution of said film roll to strip said outermost convolution from said flanges and guide it through a film passageway to the exterior of the cassette shell responsive to rotation of said spool in a film unwinding direction during application of said axial clamping forces, and wherein the improvement comprises:

at least one of said flanges includes an inside central annular flat face, closely spaced from one of the opposite sides of said film roll, and an inside peripheral annular beveled face, circumferentially inclined from said central flat face to normally intimately contact one of the opposite longitudinal edges of said outermost convolution of the film roll, whereby said axial clamping forces may concurrently radially constrain and transversely compress the outermost convolution.

* * * * *